US010504233B1

(12) United States Patent
Sanford-Rosenthal et al.

(10) Patent No.: US 10,504,233 B1
(45) Date of Patent: Dec. 10, 2019

(54) AUGMENTED DISPLAYS FOR MULTI-SURFACE AND THREE-DIMENSIONAL LIVE PERFORMANCES

(71) Applicant: Particle Ink, LLC, New York, NY (US)

(72) Inventors: Cassandra Sanford-Rosenthal, New York, NY (US); Sephi Joseph Shapira, New York, NY (US)

(73) Assignee: PARTICLE INK, LLC, New York, NY (US)

( * ) Notice: Subject to any disclaimer, the term of this patent is extended or adjusted under 35 U.S.C. 154(b) by 0 days.

(21) Appl. No.: 16/037,283

(22) Filed: Jul. 17, 2018

Related U.S. Application Data

(60) Provisional application No. 62/682,379, filed on Jun. 8, 2018.

(51) Int. Cl.
| | |
|---|---|
| *G06T 7/00* | (2017.01) |
| *G06T 7/521* | (2017.01) |
| *G06T 19/00* | (2011.01) |
| *H04N 5/74* | (2006.01) |
| *G06K 9/00* | (2006.01) |

(52) U.S. Cl.
CPC .......... *G06T 7/521* (2017.01); *G06K 9/00624* (2013.01); *G06T 19/006* (2013.01); *H04N 5/74* (2013.01); *G06T 2207/10048* (2013.01)

(58) Field of Classification Search
CPC ................ G06T 7/521; G06T 19/006; G06T 2207/10048; G06K 9/00624; H04N 5/74
See application file for complete search history.

(56) References Cited

U.S. PATENT DOCUMENTS

| | | | | |
|---|---|---|---|---|
| 9,721,321 | B1* | 8/2017 | Nayeri | G06F 17/3028 |
| 2011/0095978 | A1* | 4/2011 | Pehlivan | G08C 17/00 |
| | | | | 345/158 |
| 2014/0300547 | A1* | 10/2014 | Hosenpud | G06F 3/011 |
| | | | | 345/158 |
| 2016/0136519 | A1* | 5/2016 | Yale | A63F 13/213 |
| | | | | 463/5 |

\* cited by examiner

*Primary Examiner* — Chong Wu
(74) *Attorney, Agent, or Firm* — Mannava & Kang, P.C.; Hean L. Koo (57) ABSTRACT

Disclosed are improvements to augmented reality technology by augmenting a physical scene of a live performance via images projected onto three-dimensional physical scenes with real-time IR signal detection for driving augmentation of the live performance. For example, an improved projection mapping technique is disclosed in which a physical object is augmented with a projection image that is projected onto a physical scene. In some instances, the projection may be made in accordance with a timeline. The timeline may be used to synchronize other actions and behaviors of the system as well as the actions of live performers such as actors and users such as audience members. In some instances, the projection images may be driven by audience or other inputs to the system, such as sensor-based inputs. The sensor-based or other inputs may also or alternatively drive physical components such as actuators that impact the real-world objects.

14 Claims, 8 Drawing Sheets

AUGMENTED DISPLAYS FOR MULTI-SURFACE AND THREE-DIMENSIONAL LIVE PERFORMANCES

CROSS-REFERENCE TO RELATED APPLICATIONS

This application claims the benefit of U.S. Provisional Patent Application Ser. No. 62/682,379, entitled "AUGMENTED DISPLAYS FOR MULTI-SURFACE AND THREE-DIMENSIONAL LIVE PERFORMANCES," filed Jun. 8, 2018, which is hereby incorporated herein by reference in its entirety.

FIELD OF THE INVENTION

The invention relates to improvements to augmented reality technology by augmenting a physical scene of a live performance via images projected onto three-dimensional physical scenes with real-time infrared ("IR") signal detection for driving augmentation of the live performance.

BACKGROUND OF THE INVENTION

Conventional augmented reality technology typically requires use of a display device that overlays graphical information onto real-world image. However, use of these technologies may not be appropriate in all situations, such as when the display would create a distraction. For example, use of conventional AR technology, because of its use of display technology, may disrupt a live performance or other setting in which the light or other output of the display device would cause a distraction. Yet, augmented content can provide immersive and informative experiences. Thus, what is needed is to be able to provide augmented content while minimizing disruption and at the same time integrate immersive and interactive experiences.

SUMMARY OF THE INVENTION

The invention addressing these and other drawbacks relates to augmented reality technology by augmenting a physical scene of a live performance via images projected onto three-dimensional physical scenes with real-time IR signal detection for driving augmentation of the live performance. An example of an augmented display may include an improved projection mapping technique in which one or more real-world physical objects in a physical scene are augmented with a projection images that are projected onto the physical scene. In some instances, the projection may be made in accordance with a timeline. The timeline may be used to synchronize other actions and behaviors of the system as well as the actions of live performers such as actors and users such as audience members. In some instances, the projection images may be driven by audience or other inputs to the system, such as sensor-based inputs. The sensor-based or other inputs may also or alternatively drive physical components such as actuators that impact the real-world objects. Such action on real-world objects may in turn trigger a response from the projection images. As such, the system may build interactive and immersive performances driven by improvements to augmented reality technology and specific use of signal emitters, sensors and audience-based input.

In some implementations, the system may detect an IR or other signal from a user device that is directed to the physical scene based on sensor information from a sensor device remote from the user device. For example, the IR signal may be detected based on scanning a scene with an IR sensor for IR wavelengths that correspond to IR signals emitted by a user device. Other types of signals may be used as well, in which case other types of sensors may scan a scene for other wavelengths or types of signals emitted by the user device. Furthermore, in alternative or additional implementations, beacons may provide the user device with orientation information so that the user device may orient itself to the scene. Onboard orientation sensors of the user device may be used to obtain a relative orientation of the user device, which is then mapped to the scene based on the beacon signals received at the user device.

The system may identify a location on the physical scene at which the IR signal from the user device is directed. The system may generate one or more projection images to augment the physical scene at the location. The projection images may be already projected, in which case the behavior of the image may be altered (such as causing the image to be placed at the location, causing the image to change its appearance, causing any audio associated with the image to be altered, etc.). The projection images may not be already projected, in which case the system may add the projection images to the scene. In these instances, audio or other content associated with the projection images may be added as well.

The system may project the one or more projection images onto the physical scene at the location. It should be noted that instead of or in addition to placing projection images at the location, the system may record a relevant scene so that an audience member may use the user device to point to locations in a scene that the audience member wishes to be recorded. In this instance, the system may record or otherwise note the projection images around the pointed-to location of the scene and provide the recording and/or relevant images to the audience member. In this manner, the user device may act as a "camera" that is not intrusive to the performance as an actual camera.

In some implementations, the system may manipulate physical objects so that they interact with projection images (in addition to live performers interacting with projection images). To do so, the system may transmit signals to one or more actuators in a set that cause the actuators to physically move. Such physical movement may impact physical objects in a set. For example, an actuator may be placed at a location in the set in a manner that, when actuated, causes a change to a physical object. This change may affect one or more projection images or may appear to be caused by the projection images. For example, an actuator may be actuated to cause a physical object to be moved for a projection image. In particular, the physical object may provide a path for the projected to appear to traverse. In another example, a projection image may appear to interact with a physical object, and the actuator may move the physical object as if the projection image caused such movement.

In some instances, audience participation may be encouraged by requesting (e.g., through a projection image, a live performer, a user device, etc.) an audience member to physically interact with a physical object as part of the storyline. For example, the audience member may be requested to build a bridge or other structure that the projection image can use, which may advance the storyline. The system may detect such physical interaction via image processing techniques or through manual input by a live performer or other user that indicates performance of the physical interaction occurred. As such, audience interaction with the augmented performance may be enhanced.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method of augmenting a physical scene of a live performance via images projected onto three-dimensional physical scenes with real-time IR signal detection for driving augmentation of the live performance.

Figure 1:
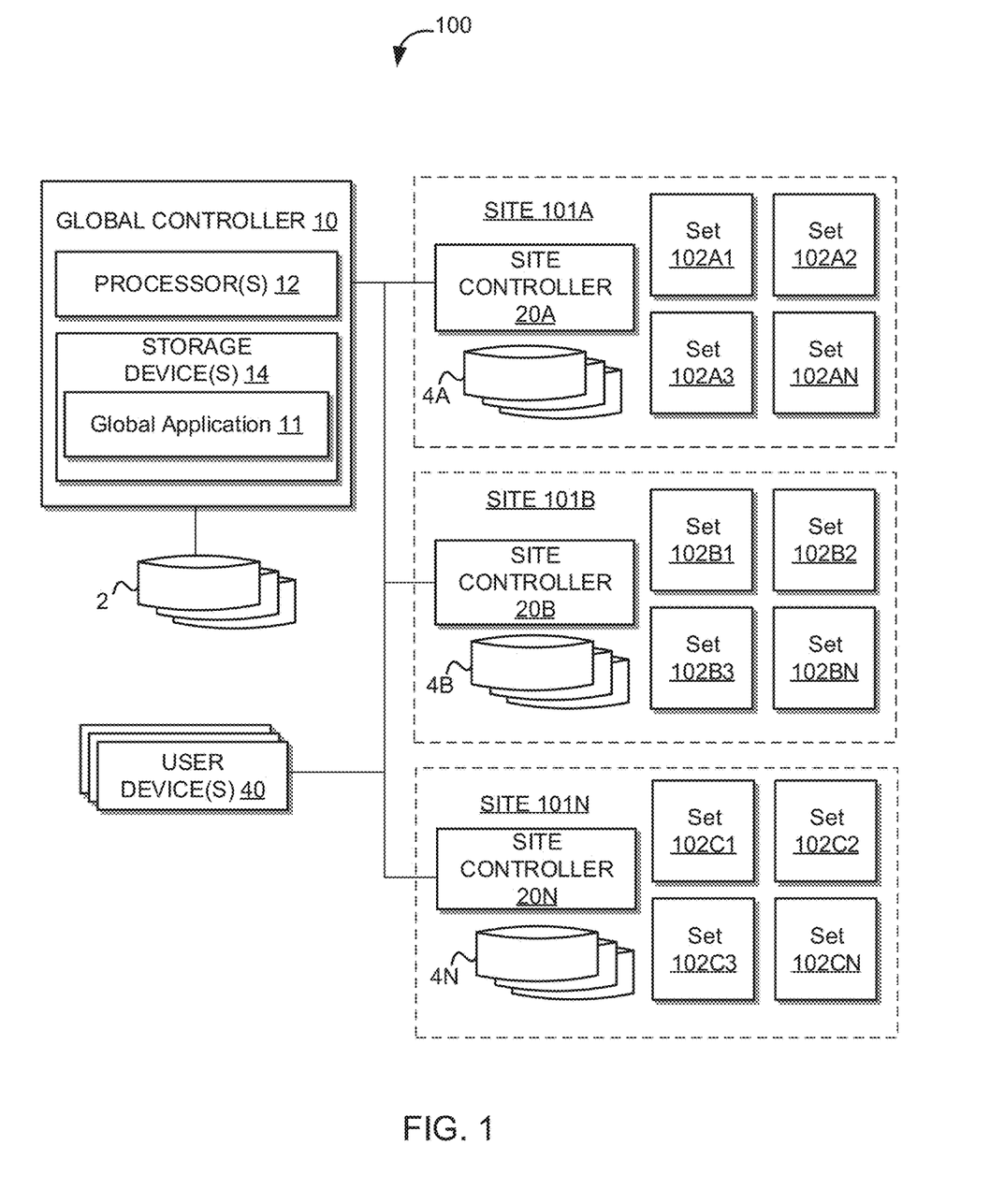
FIG. 1 illustrates a system for augmenting live performances with computer-generated overlays onto one or more physical sets, according to an implementation of the invention.

FIG. 1 illustrates a system 100 for augmenting live performances with computer-generated overlays onto one or more physical sets, according to an implementation of the invention. In one implementation, system 100 may include a global controller 10, which manages multiple sites (illustrated as Sites 101A-N), and one or more global databases 2. Each of sites 101A-N may include: a site controller 20 (illustrated as site controllers 20A-N), one or more respective sets (illustrated as set 102A1-4, 102B1-4, 102C1-4, and 102D1-4), one or more site databases 4 (illustrated as site databases 4A-N), and/or other components. An individual site will also be referred to as a site 101, and an individual set will also be referred to as a set 102. Each of the sites 101 may represent a physical location at which a live performance is augmented with the computer-generated displays and computer-mediated actions described herein. For example, site 101A may be physically located in one state or country while site 101B may be physically located in another state or country. Each site controller 20 may be communicably coupled with and receive instructions and content from the global controller 10. As such, the global controller 10 may provide each site controller 20 with instructions for augmenting real-world performances with computer-generated displays and computer-mediated actions, as well as computer-generated content for doing so. It should be noted that the global controller 10 may be located remote from each of the site controllers 20.

The global controller 10 may include one or more processors 12, one or more storage devices 14, and/or other components. Processors 12 may be programmed by one or more computer program instructions. For example, processors 12 may be programmed by a global application 11, and/or other instructions. The global application 11 may coordinate the activities of the different sites 101. For instance, the global application 11 may provide each of the sites with different storylines. These storylines may be geographically specific in that each site 101 may be provided with a different storyline and/or different projection images based on the geolocation of each site. In this manner, different geographic regions may be provided with different content.

Each set 102 of a given site 101 may provide a portion of the site's storyline. For example, the audience may be moved from one set 102 to the next to experience a different part of the storyline. As such, each set 102 may be associated with and present to audience members its own unique set of content (such as projection images, actuator controls, audience participation inputs, etc.), as well as providing its own unique physical scenes and performances.

In some implementations, each site 101 may include an area where audience members may obtain information about the performance through conventional displays such as conventional augmented displays using their personal devices. This area may precede the main sets where projection images are provided.

Figure 2:
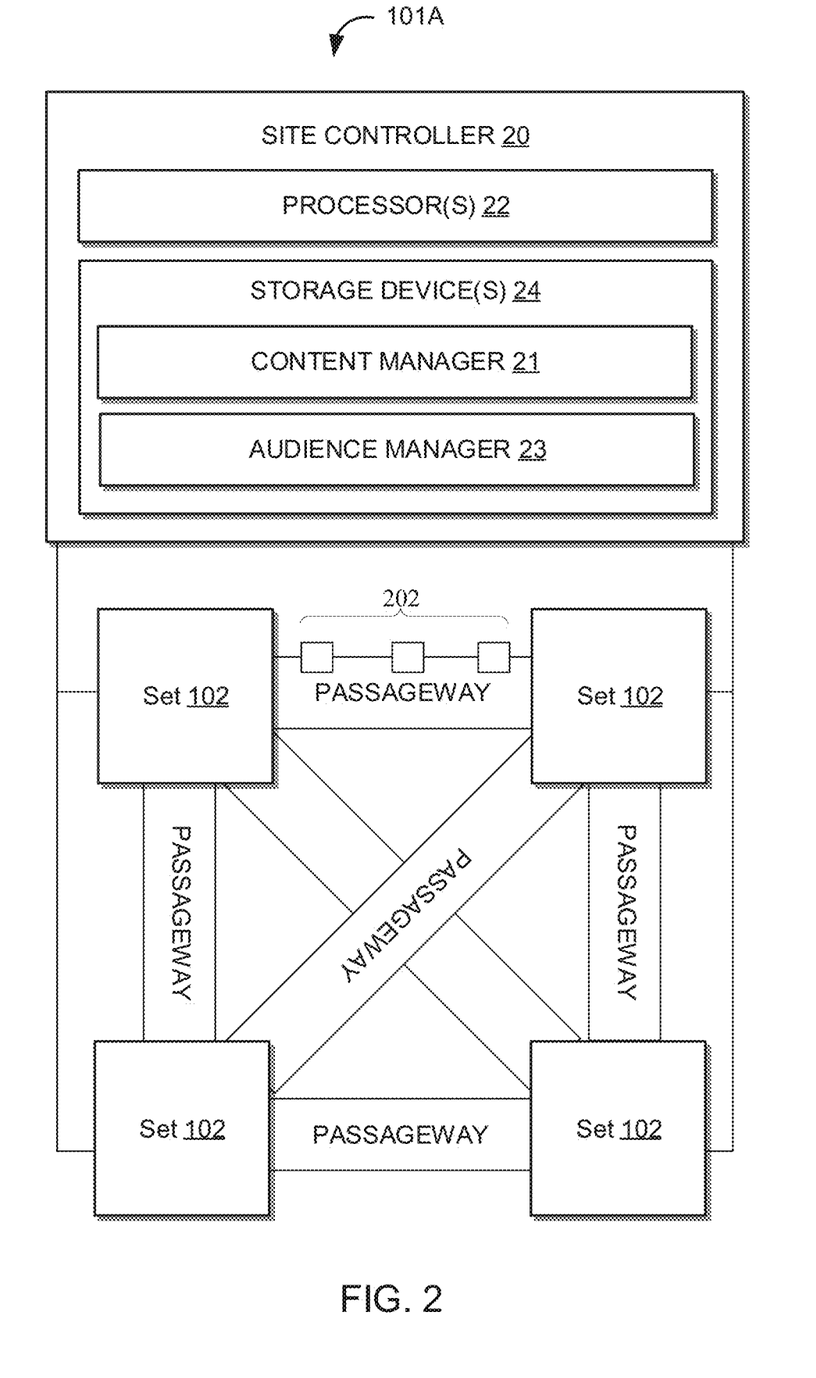
FIG. 2 illustrates a site for an augmented live performance, according to an implementation of the invention.

FIG. 2 illustrates a site controller 20 that controls computer-generated overlays onto one or more physical sets 102, according to an implementation of the invention. Each site controller may include one or more processors 22, one or more storage devices 24, and/or other components. Processors 22 may be programmed by one or more computer program instructions. For example, processors 22 may be programmed by a content manager 21, an audience manager 23, and/or other instructions.

Content manager 21 may direct the content presented within each of the sets 102 under the control of the site controller 20. For instance, the content manager 21 may provide portions of each storyline corresponding to each set 102, projection images to be projected onto each set 102, actuation controls to be implemented at each set 102, and/or other content. Content manager 21 may provide content to passageway devices 202. Each passageway device 202 may include a visual, audio, or other display device that provides content to an audience member as the audience member traverses from one set 102 to the next.

Figure 6A:
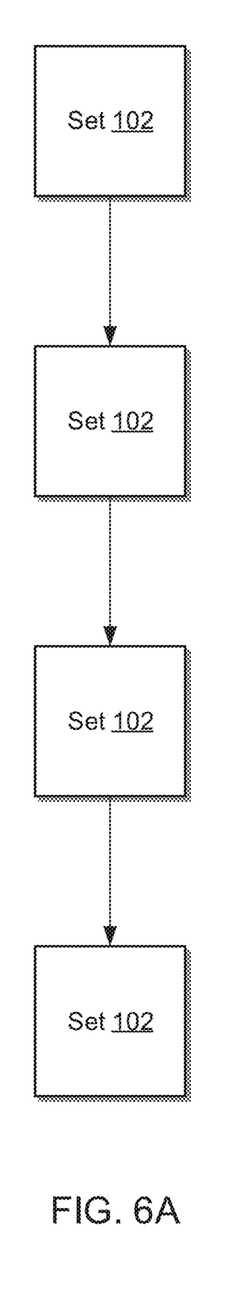
FIG. 6A illustrates an example of paths between sets, according to an implementation of the invention.
Figure 6B:
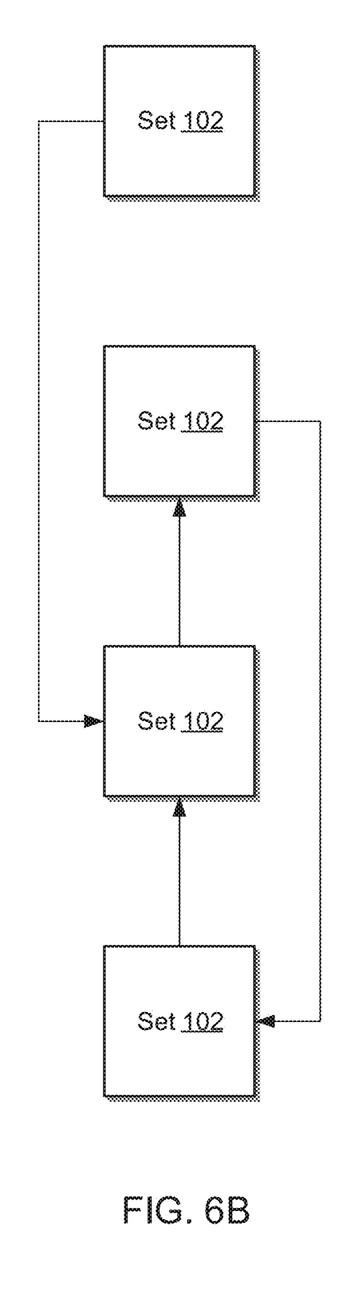
FIG. 6B illustrates an example of paths between sets, according to an implementation of the invention.

Because of the multi-set and interactive nature of the performance, crowd control and management may become problematic. Referring to FIGS. 6A and 6B in which arrows represent movement of audience members through passageways, for example, multiple paths may be traversed by audience members from one set 102 to another set 102.

Thus, when content is presented to multiple sets concurrently where one audience group experiences one set 102 concurrently while another audience group experiences another set 102, delay in one group may cause problems with crowd flow from set to set. For example, if one group of audience is delayed, this may delay other group movement through the sets. The system may monitor whether a given group is on-time. If there is a delay, the other groups may be delayed as well. Alternatively or additionally, the late group may be sped up by skipping non-critical portions. Even if only one audience is moved through the sets 102 without concurrent presentation, an overall length of the performance may be controlled even if one set has been delayed.

Figure 7:
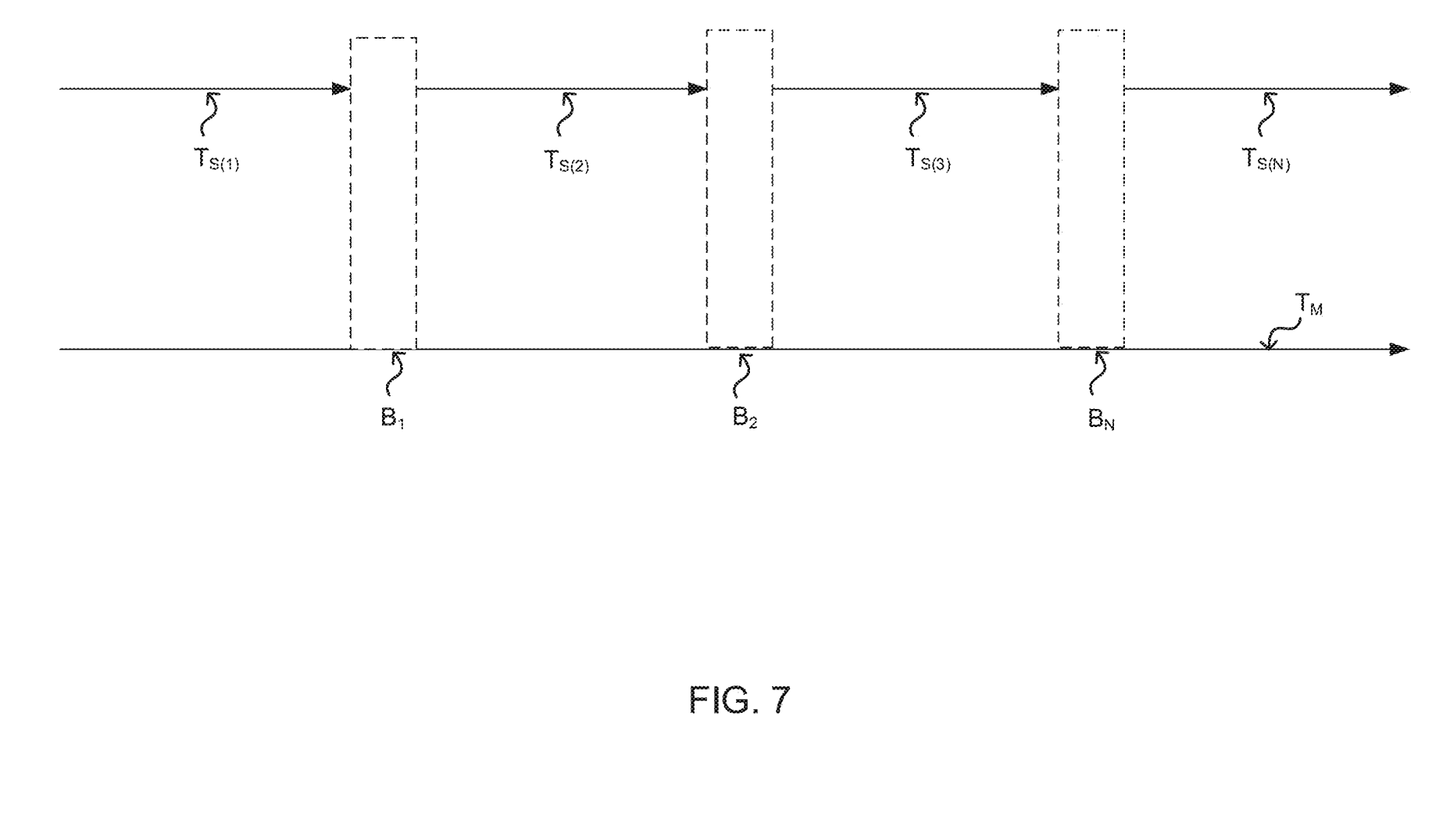
FIG. 7 illustrates a schematic example of crowd management between sets, according to an implementation of the invention.

In some implementations, audience manager 23 may manage audience movements. For example, referring to FIG. 7, audience manager 23 may monitor a master timeline ($T_M$) over an expected duration of each set ($T_{S(1)-(4)}$). Between each set may exist a buffer time B1-N. The buffer time may be a predefined length of time, which may be dynamically adjusted depending on the progress of audience members through different sets. For example, if a given set is delayed, the corresponding buffer time may be reduced. Within the buffer time, as an audience group is moving from one set to the next, the content manager 21 may provide content to occupy the audience via passageway devices 202. In instances where user device 140 are full-featured devices having more than just an emitter and related controls, the content manager 21 may provide content to the user devices as well. The content manager 21 may alter the buffer time by altering the duration or amount of content provided. For example, to decrease the buffer time (to speed up delayed performances from a prior set), the content manager 21 may reduce the amount or duration of content provided during the buffer time and vice versa to slow down progress to the next set. In this manner, an expected finish time for the performance may be achieved and/or delays from moving from one set to another may be addressed so that audience groups do not conflict.

Figure 3:
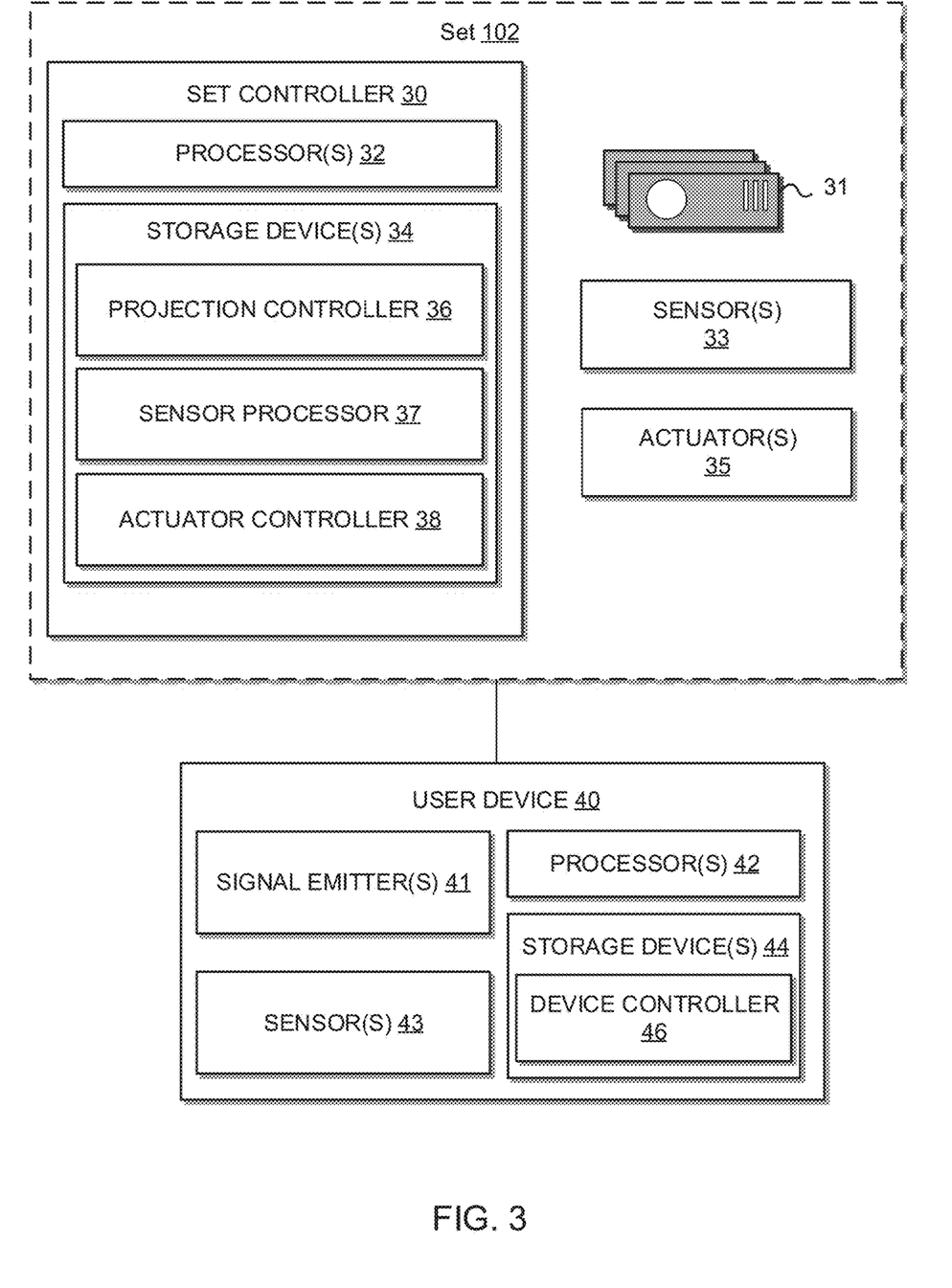
FIG. 3 illustrates a schematic diagram of a set and one or more user devices, according to an implementation of the invention.

FIG. 3 illustrates a schematic diagram of a set 102 and one or more user devices 140, according to an implementation of the invention. Each set 102A-MN illustrated in FIG. 1 may be configured as illustrated in FIG. 3. Each set 102 may include a set controller 30, a projection device 31, one or more sensors 33, one or more actuators 35, and/or other components. The projection device 31 may include a projector or other display device that can overlay images onto a physical object. In some instances the projection devices 31 may be networked together in a mesh network. In some instances the projection devices 31 may each be housed individually. In some instances the projection devices 31 may be housed in a single housing. The one or more sensors 33 may include a emission sensor (e.g., an InfraRed (IR) sensor, a laser sensor, etc.) or other type of sensor that can detect emitted signals described herein. The sensors 33 may be standalone sensors dispersed throughout the set 102 and/or be incorporated into other devices such as a projection device 31. The one or more actuators 35 may include a device such as a motor, a solenoid, or other type of device that can physically manipulate a physical object.

The set controller 30 may receive inputs from the sensors 33, and provide outputs to the projection device 31 and the one or more actuators 35 to facilitate augmented live performances. To do so, the set controller 30 may include one or more processors 32, one or more storage devices 34, and/or other components. Processors 32 may be programmed by one or more computer program instructions. For example, processors 32 may be programmed by a projection controller 36, a sensor processor 37, an actuator controller 38, a user device interface 39, and/or other instructions. The set controller 30 (and its components) will be described below with further reference to FIGS. 4 and 5.

Augmented Multi-Surface Live Performances

Figure 4:
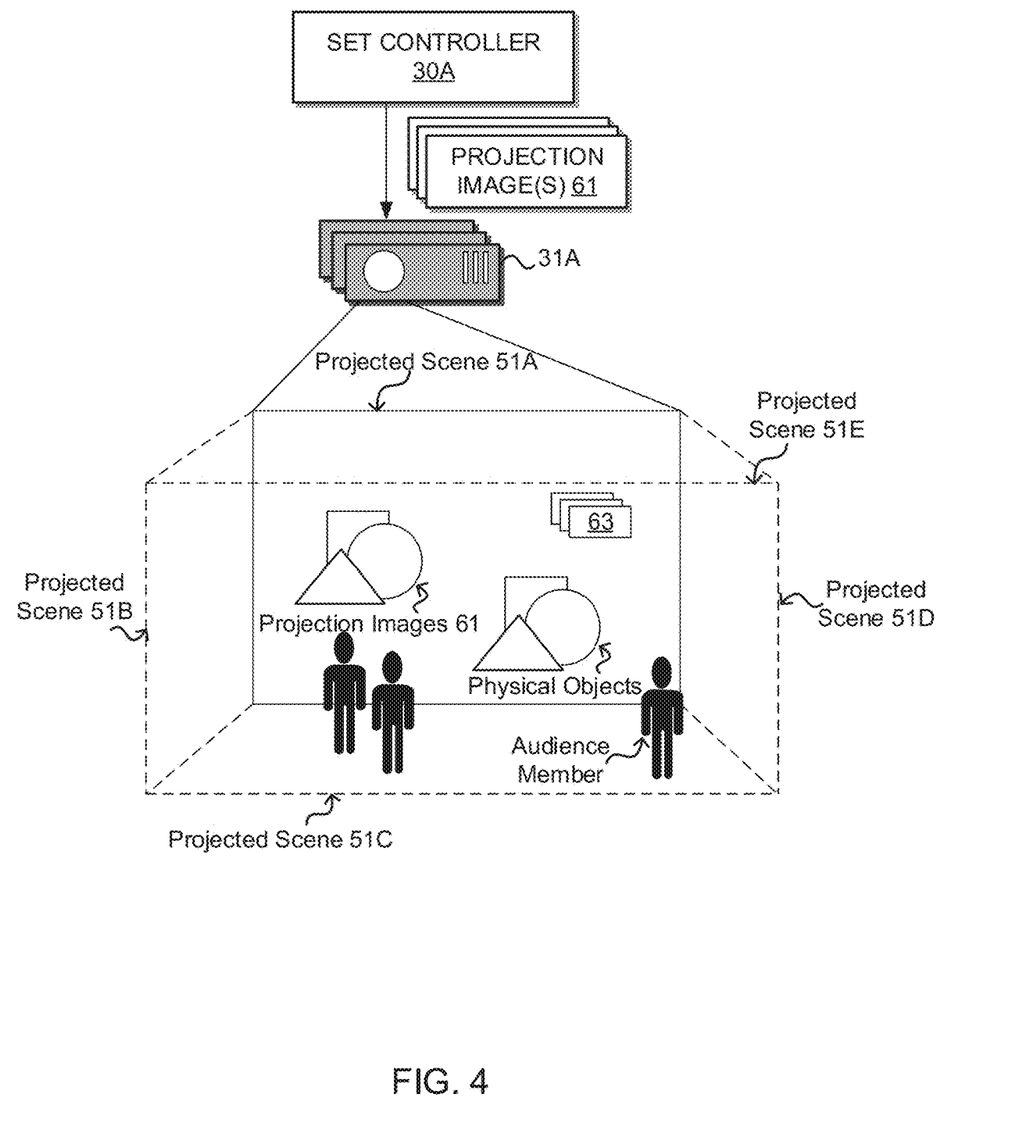
FIG. 4 illustrates a set controller that projects various scenes onto a set, according to an implementation of the invention.

The projection controller 36 may provide one or more projection images 61 for projection by a projection device 31 to create a projected scene 51 (illustrated in the Figures as Projected Scenes 51A-E) in a set 102. The projection images 61 may include a static image, a video image, or other type of image that is projected onto a physical object to create a projected scene 51. The set 102 illustrated in FIG. 4 is depicted as a room having four walls, a floor, and a ceiling. Other room shapes may be used as well, and the walls, ceilings, and floor need not be flat. Each projected scene 51 may be overlaid onto to a physical scene of the set. The physical scene may include physical objects. The physical objects may include a surface of a room that defines the set, a live performer, an object like a prop or furniture, and/or other object that may be augmented by projection image 61. While a surface of the set will usually correspond to a vertical surface such as a vertical wall of the set, the surface may correspond to a horizontal surface such as the floor or ceiling.

The projection images 61 may provide at least part of the storyline for the augmented performance for a site. The live performers may act out other parts of the storyline as well. Because each set 102 may provide a different part of the storyline, each set 102 may have a unique set of one or more projection images 61 to project. The projection controller 36 may obtain the projection images 61 from a memory such as storage device 34 or other accessible storage (including, for example, a remote cloud-based storage site), site controller 20, and/or global controller 10.

Audience Input for Controlling Projection Images

In some instances, audience members may control a user device 40 to interact with the performance. For example, the user device 40 may provide input for controlling one or more projection images 61 already projected onto a projected scene 51 or adding a new projection image 61 that was not previously projected to a projected scene 51. The projection images 61 that the audience member can influence in this way may be a predefined projection image that is part of the storyline or a custom projection image 61 customized by the audience member. For example, in some instances, the audience member may select which projection image 61 that the audience member is to control through a user device 40 operated by that audience member. In some of these instances the audience member may customize an appearance of the projection image. In either instance, in some implementations, the projection image 61 may be modified to act or be newly projected to act in a manner consistent with the storyline so that the audience may participate in advancement of the story. In other words, the modified behavior of an existing projection image 61 or appearance of a new projection image 61 may be expected based on the storyline and session collection or analysis may be initiated based on this expectation.

The user device 40 may typically, though not necessarily, be a dedicated user device 40 that is provided to audience members, such as at the start of an augmented performance. In these instances, the user device 40 may be a dedicated device to perform the emitting and/or sensing functions described herein. In other instances, the user device 40 may be the user's personal user device equipped with an agent such as a mobile application.

The user device 40 may include one or more signal emitters 41, one or more sensors 43, one or more processors 42, one or more storage devices 44, and/or other components. The one or more processors 42 may be programmed by a device controller 46 that controls the signal emitters 41 and/or processes information from the sensors 43. The one or more signal emitters 41 may include a transmission device that is configured to emit a signal that can be read by a sensor 33. So as to minimize disruption of the live performance, the signal emitters 41 will typically, though not necessarily, emit signals that are not within a visible spectrum, which is generally 390 to 700 nanometers (nm). For instance, the signal emitter 41 may typically be an IR emitter that emits an IR signal within an IR wavelength range (generally 700 nm-1 millimeter). Other types of emitters that emit within other non-visible ranges (such as ultraviolet or microwave range) other than an IR emitter may be used as well. However, emitters that emit within a visible wavelength range such as a laser emitter that emits a laser signal may be used as well.

Figure 5:
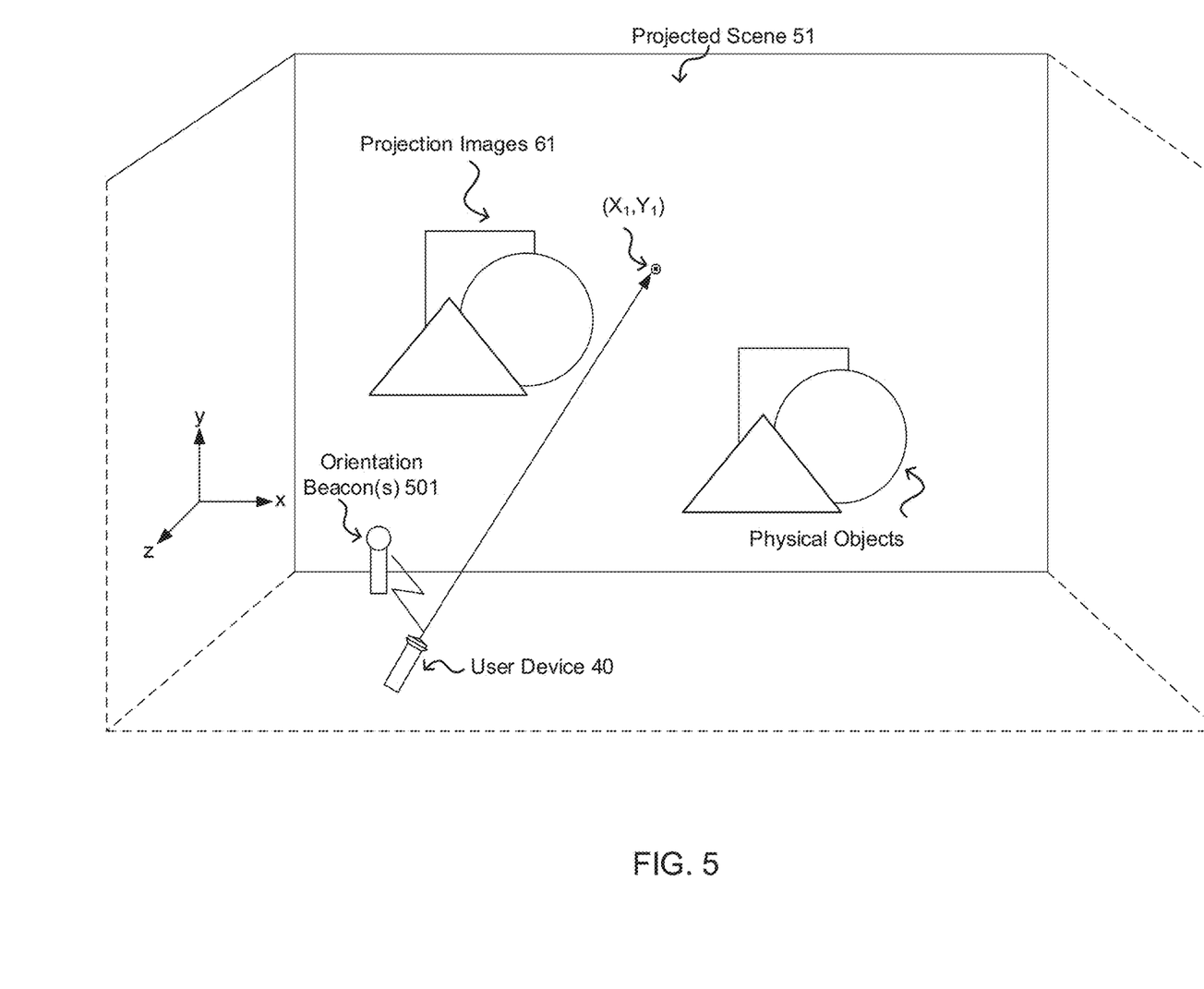
FIG. 5 illustrates a user device that interacts with a scene, according to an implementation of the invention.

The user device 40 may include an input member (not illustrated) such as a button that activates the signal emitter 41 to emit a signal. Referring to FIG. 5, the user device 140 may be pointed toward a projected scene 51 and the emitted signal may be directed to a position illustrated by the position ($X_1$, $Y_1$), using the X, Y, and Z axes for reference. It should be noted that the X, Y, and Z axes may be predefined and arbitrary. For instance, the Y axis may be predefined as referring to a height of the projected scene 51, the W axis as the width of the projected scene 51, and the Z axis as a depth of the room in which the projected scene 51 is located. These axes may further be relative to the projected scene 51. For instance, these axes may be associated with the height, width and depth when the user device 40 is pointed toward an adjacent wall (and corresponding adjacent projected scene 51). As such, an audience member may direct the user device 40 to emit a signal in three dimensions toward any projected scene 51 in a set 102.

In some instances, each user device 40 may be configured to emit the same signal (e.g., same wavelength) such that different audience members each have a user device that emits the same signal. In some instances, one user device 40 may be configured to emit a different signal (e.g., different wavelength) than another user device 40. In these instances, audience members may be distinguished from one another such that a first audience member (or first group of audience members having the same devices emitting the same signals) can control projection images 61 in a first way while a second audience member (or second group of audience members having the same devices emitting the same signals) can control projection images 61 in a second way. In still some other instances, a user device 40 may include multiple an input members that when actuated each generate different signals. In this manner, a single user device 40 may emit multiple signals, each signal being uniquely detectable and each causing a corresponding functionality. In either instance, the emitted signals facilitate interactive audience participation in augmented performances, as will be described below. The sensor 33 may detect a signal emitted from the user device 40 and provide sensor information relating to the detected signal to the sensor processor 37. The sensor processor 37 may obtain and analyze the sensor information from the sensor 33. Based on the analysis, the sensor processor 37 may localize the position where the signal was directed, the wavelength of the detected signal, and/or determine other characteristics of the detected signal. In this manner, the sensor processor 37 may detect a location at which an audience member is pointing with the user device 140 based on the sensor information from the sensor 33.

The sensor processor 37 may provide the results of the analysis to the projection controller 36. In implementations in which one emitted signal is identifiably unique from another emitted signal, for example, the results of the analysis may include the wavelength of the detected signal or other identifying information.

The projection controller 36 may project one or more projection images 61 to the location where the emitted signal was directed. These projection images 61 may already be projected onto a projected scene 51. In this case, the projection images 61 may be modified based on the location. For example, an audience member may point a user device 140 to emit signal at a particular location to direct a projected character (e.g., a projection image 61) to that location. The projection controller 36 may cause the projection device 31 to project the projected character to that location. In this manner, the audience member may control where the projected character is placed. The projected character may be animated as if walking or otherwise traveling to the location.

In some instances, the emitted signal may cause a new projection image 61, that was not previously projected immediately prior to pointing the user device 140, to appear at the particular location. In this manner, the audience member may cause a projection image 61 to appear. For example, the audience member may, as part of the storyline, help a projected character by causing a projected bridge to appear so that a projected character can cross the projected bridge. In other examples, the audience member may cause a new projected character to appear, where the new character is part of the storyline. Other types of new projection images 61 may be projected in response to the emitted signal.

In the foregoing examples, if all user devices 140 emit the same signal, to avoid duplicative signals from multiple audience members, the sensor processor 37 may account for the duplicative signal in various ways. For example, the sensor processor 37 may process only one of the signals and ignore the rest. The signal that is processed may be selected randomly or, if the storyline requires a particular action to be taken with respect to a particular location (such as a projected bridge being projected), then the sensor processor 37 may process the signal that is closest to the particular location. In other examples, the sensor processor 37 may cluster the signals and identify an average location of each cluster. One of the clusters may be selected for processing. That cluster may be identified based on the particular location as described above, based on an expected action to be taken.

As described above, some user devices 140 may emit different signals than other user devices 140. Likewise a single user device 140 may emit different signals depending on which user input member has been actuated. In these instances, the different signals may cause different actions to be taken by projection images 61 and/or different projection images 61 to be newly projected.

In some instances, instead of or in addition to detecting where a user device 140 has been pointed based on signals emitted by the signal emitter 41, the system may do so based on sensors 43 from the user device 140 detecting beacon signals from one or more beacons 501 placed in the set to help orient the user devices. For example, the sensors 43 may include orientation sensors such as gyroscopes that obtain the orientation of the user device 140. The sensors 43 may also include IR or other sensors configured to detect beacon signals (in an IR or other wavelength). The user device 140 may detect the beacon signals and orient the user device 140 in combination with the orientation sensor data. In this manner, the orientation of the user device 140 may be mapped to a location in the set based on the beach signals, which may inform the user device 140 of the X, Y, and/or Z axis positioning. The user device 140 may then communicate the location where the user device 140 is pointed to the set controller 30, which controls projection images 61 based on the location as described above.

In instances where non-visible signals are used to location where a user device 140 is pointed, the system may project an image, such as a dot, to indicate such positioning. This may help guide the audience member into pointing the user device 140 at an intended location.

In some implementations, the location at which a user device 140 is pointed may be used to record a projected scene or otherwise index a time in the master timeline that the location was pointed to. For example, using the user device 140, an audience member may indicate a location and time of focus of interest and the system may record the projected scene 51 of interest. In this manner, the audience member may "record" a scene without using an actual camera, which may be obtrusive during an augmented live performance. The system may store an association of the projection images 61 associated with the location and/or may actually record the location of interest with a system sensor (such as a camera sensor). The recording may be provided to the audience member for sharing or otherwise viewing later.

Controlling Multi-Surface Augmented Overlays

Because the projection images 61 may be projected onto different surfaces in a three-dimensional set, each of the projection images 61 may be assigned to different projection scenes 1-5. For instance, a first projection device 31 may be positioned to project onto a first wall of the set while a second projection device 31 may be positioned to project onto a second wall of the set. Other projection devices 31 may be similarly positioned as well. Each projection device 31 may be assigned with a particular projected scene 51 and an identifier that identifies the projection device. As such, projection images 61 assigned to a particular scene may be routed to the appropriate projection device 31 by the projection controller 36. Likewise, sensors 33 and actuators 35 may be assigned to particular scenes in a set so that they may be similarly localized to a given scene.

The projection controller 36 may time the projection images 61 provided to projection device 31. For example, a master timeline may coordinate the activities of the projection controller 36, live performers, actuator controller 38, and/or other components or elements of the augmented performance. The projection controller 36 may accordingly cause projection images 61 to be projected according to the master timeline. In some instances, more than one projection device 31 in a given set may be provided with respective projection images 61. In this manner, more than one wall or projected scene 51 may be simultaneously presented to the audience. In some instances, projected scenes 51 may be serially presented such that the audience member is led around the room to follow projection images 61, which live performers may interact with.

Interfacing Physical Objects with Projection Images

In some implementations, the actuator controller 38 may send signals to one or more actuators 35 that cause the actuator to physically move. Such physical movement may impact physical objects in a set. For example, an actuator 35 may be placed at a location in the set in a manner that, when actuated, causes a change to a physical object. Such change may affect one or more projection images 61 or may appear to be caused by the projection images 61. For example, an actuator 35 may be actuated to cause a physical object to be presented to a projection image 61. In another example, a projection image 61 may appear to interact with a physical object, and the actuator 35 may move the physical object as if the projection image 61 caused such movement.

In some instances, audience participation may be encouraged by requesting (either by the projection image 61 or by a live performer) an audience member to physically interact with a physical object as part of the storyline. For example, the audience member may be requested to build a bridge or other structure that the projection image 61 can use, which may advance the storyline. The system may detect such physical interaction via image processing techniques or through manual input by a live performer or other user that indicates performance of the physical interaction occurred. As such, audience interaction with the augmented performance may be enhanced.

In some implementations, referring to FIG. 4, each set 102 may include one or more positional markers 63. The markers 63 may guide live performers and/or audience members where to perform or view the performance. In this manner, a given set 102 may be staged to guide performers and audience members to facilitate interactive storytelling.

In some implementations, each set 102 may include one or more cameras, microphones, and/or other devices to capture audience reactions. Each user device 140 may include such devices as well. The data collected from these devices may be used to customize storylines such as by emphasizing or prolonging projection images when sensed audience data indicates a high level of engagement.

In some instances, user devices 140 may include full-featured devices that provide more than just signal emitting and relating functions. For example, the user device 140 may provide Augmented/Mixed/Virtual Reality displays that are augmented or controlled depending on the storylines and/or depending on what signals from other audience members are detected. For example, the projection controller 36 may provide additional feedback (e.g., visual, audio) to users through the user device 140. In instances that user device 140 is wearable, the additional feedback may include tactile feedback through onboard actuators. In some instances, user devices 140 may be equipped with a projection device to act as a local projection device that can project onto the scene. In this manner, users may be provided with interactive control over the performance. Such control may be limited, however, to minimize distraction from the main storyline. For instance, such control may be permitted only at certain times of the storyline. Examples include when audience input and interaction is solicited to fit in with the storyline.

Figure 8:
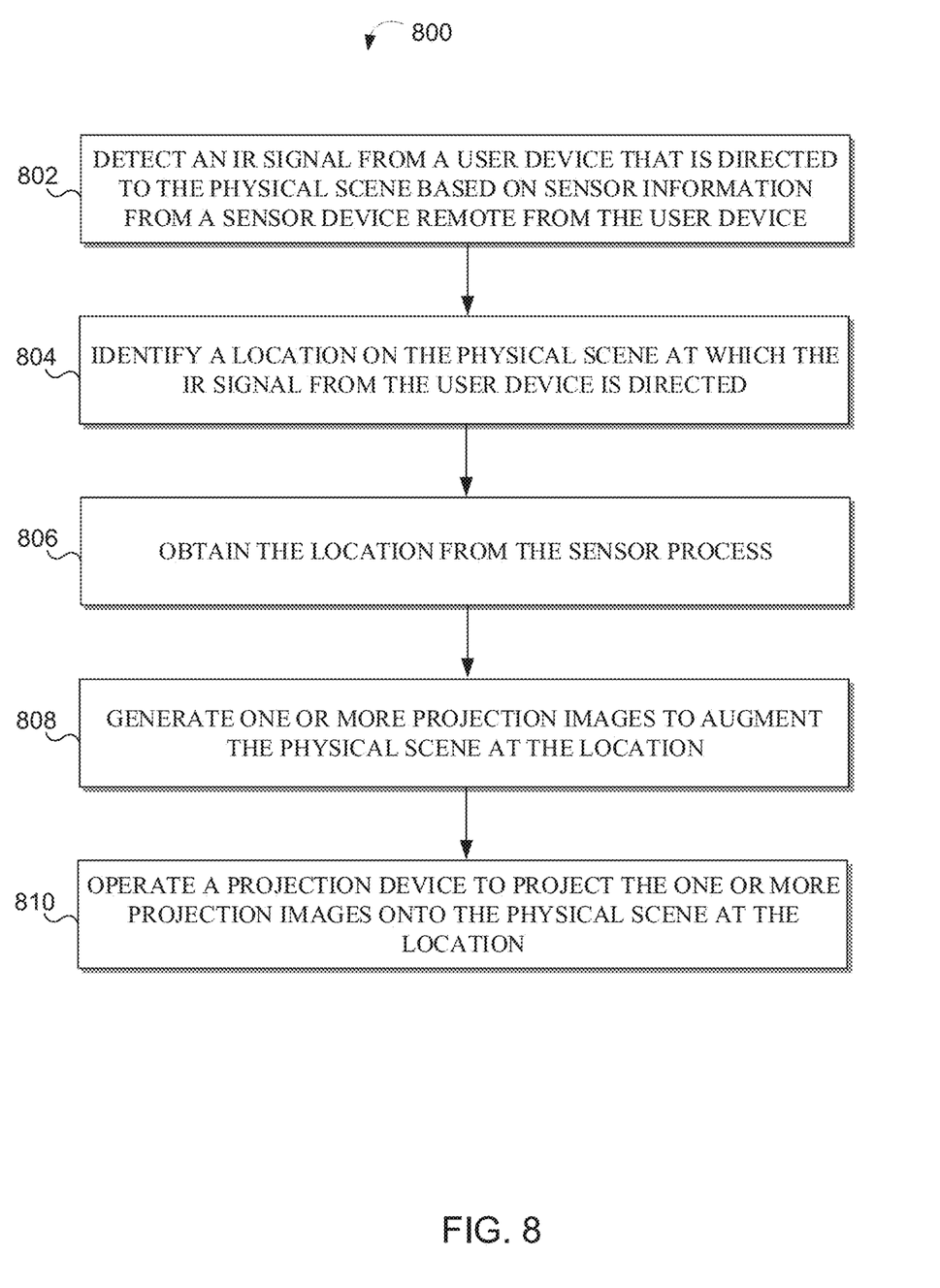
FIG. 8 illustrates a process for augmenting a physical scene of a live performance via projection overlays with real-time infrared ("IR") signal detection for driving augmentation of the live performance, according to an implementation of the invention.

FIG. 8 illustrates a process 800 for augmenting a physical scene of a live performance via projection overlays with real-time infrared ("IR") signal detection for driving augmentation of the live performance, according to an implementation of the invention.

In an operation 802, process 800 may include detecting an IR signal from a user device that is directed to the physical scene based on sensor information from a sensor device remote from the user device. For example, the IR signal may be detected based on scanning a scene with an IR sensor for IR wavelengths that correspond to IR signals emitted by a user device. Other types of signals may be used as well, in which case other types of sensors may scan a scene for other wavelengths or types of signals emitted by the user device.

Furthermore, in alternative or additional implementations, beacons may provide the user device with orientation information so that the user device may orient itself to the scene. Onboard orientation sensors of the user device may be used to obtain a relative orientation of the user device, which is then mapped to the scene based on the beacon signals received at the user device.

In an operation 804, process 800 may include identifying a location on the physical scene at which the IR signal from the user device is directed. In an operation 806, process 800 may include obtaining the location.

In an operation 808, process 800 may include generating one or more projection images to augment the physical scene at the location. The projection images may be already projected, in which case the behavior of the image may be altered (such as causing the image to be placed at the location, causing the image to change its appearance, causing any audio associated with the image to be altered, etc.). The projection images may not be already projected, in which case the process 800 may include adding the projection images to the scene. In these instances, audio or other content associated with the projection images may be added as well.

In an operation 810, process 800 may include projecting the one or more projection images onto the physical scene at the location. It should be noted that operations 808 and 810 may include or be substituted with recording a relevant scene so that an audience member may use the user device to point to locations in a scene that the audience member wishes to be recorded. In this instance, process 800 may record or otherwise note the projection images around the pointed-to scene and provide the recording and/or relevant images to the audience member. In this manner, the user device may act as a "camera" that is not intrusive to the performance as an actual camera.

Although described herein as being used in immersive live theatrical experiences, the systems and methods may be used in other contexts as well. For example, the system may be used for real-time, dynamic marketing where projection images may correspond to marketing content that is projected onto a physical scene when an emitted signal from a user device is detected. The system may be applied to event augmentation (e.g., sporting events, movies, concerts, etc.), where the projection images may correspond or augment the event with event-specific content. The system may be applied to training/simulations, wherein the projection images may correspond to training or other content.

Although illustrated in FIG. 1 as a single component, global controller 10, site controller 20, set controller 30, and user device 40 may each include a plurality of individual components (e.g., computer devices) each programmed with at least some of the functions described herein. In this manner, some components of global controller 10, site controller 20, set controller 30, and/or user device 40 may perform some functions while other components may perform other functions, as would be appreciated. The one or more processors 12, 22, 32, and 42 may each include one or more physical processors that are programmed by computer program instructions. The various instructions described herein are exemplary only. Other configurations and numbers of instructions may be used, so long as the processor(s) 12, 22, 32, and 42 are each programmed to perform the functions described herein.

Furthermore, it should be appreciated that although the various instructions are illustrated in FIG. 1 as being co-located within a single processing unit, in implementations in which processor(s) 12, 22, 32, and 42 may each include multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 12, 22, 32, and 42 may each be programmed by one or more additional instructions that may perform some or all of the functionality attributed herein to one of the instructions.

The various instructions described herein may be stored in each of a storage device 14, 24, 34, and 44, which may comprise random access memory (RAM), read only memory (ROM), and/or other memory. The storage device may store the computer program instructions (e.g., the aforementioned instructions) to be executed by processor(s) 12, 22, 32, and 42 as well as data that may be manipulated by processor(s) 12, 22, 32, and 42. The storage device may comprise floppy disks, hard disks, optical disks, tapes, or other storage media for storing computer-executable instructions and/or data.

The various databases 2 and 4A-N described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein. For example, the databases may store a master timeline, a storyline, projection images 61, assignment mappings (e.g., assignments of projection devices 31, sensors 33, actuators 35, etc., to specific scenes of a set), and/or other data used by the system described herein.

The various components illustrated in the Figures may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware. In particular, the global controller 10 may be coupled to each site controller 101 via a WAN. Each site controller 20 may be coupled to each set controller 30 via a WAN and/or LAN. Each set controller may be coupled with each other via a WAN and/or LAN.

The various processing operations and/or data flows depicted in FIG. 8 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of augmenting a physical scene of a live performance via projection overlays for driving augmentation of the live performance, wherein the physical scene is part of a multiple scene set comprising at least a second physical scene adjacent to the physical scene in the multiple scene set, and wherein the live performance includes a storyline that spans the multiple scene set, the method comprising:
    accessing, by a processor, sensor information from a sensor device;
    identifying, by the processor, a location on the physical scene at which a user device is directed based on the sensor information;
    generating, by the processor, one or more projection images to be newly projected onto the physical scene to augment the physical scene at the location;
    causing, by the processor, a projection device to project the one or more projection images onto the physical scene at the location;
    identifying, by the processor, a first projection image associated with a first portion of the storyline, the first projection image assigned to be projected by the projection device;
    causing, by the processor, the projection device to project the first projection image onto the physical scene;
    identifying, by the processor, a second projection image associated with a second portion of the storyline, the second projection image assigned to be projected by a second projection device; and
    causing, by the processor, the second projection device to project the second projection image onto the second physical scene after the first projection image is projected onto the physical scene.

2. The computer implemented method of claim 1, the method further comprising:
    adjusting the behavior of the one or more projection images; and
    causing the projection device to project the one or more projection images based on the adjusted behavior.

3. The computer implemented method of claim 1, wherein the multiple scene set is part of a site having multiple sets through which audience members traverse to experience the storyline such that the storyline spans the multiple sets, the method comprising:
    coordinating the projection of the first projection image at the physical scene with the projection of the second projection image at a second physical scene of a second set of the multiple sets based on a timeline of the storyline.

4. The computer implemented method of claim 1, wherein the live performance follows a storyline that includes an audience interactive element that requires an audience member to perform a physical action to advance the storyline, the method further comprising:
    detecting that the physical action has been performed; and
    controlling the projection device to project at least one projection image that corresponds to the physical action to give the appearance that the physical action caused a behavior of the least one projection image.

5. The computer implemented method of claim 1, the method further comprising:
    controlling the projection device to project at least one projection image that appears to interact with a physical object; and
    controlling an actuator device to move the physical object responsive to projection of the at least one projection image to give the appearance that the least one projection image caused the physical object to be moved.

6. The method of claim 1, further comprising:
    accessing a master timeline for synchronizing actions of the one or more projection images and a live performer;
    identifying a first projection image to be projected at a first time in the master timeline; and
    causing the projection device to project the first projection image based on the first time.

7. The method of claim 6, further comprising:
    recording a relevant scene and/or the one or more projection images based on the location of the physical scene at which the user device is directed.

8. The method of claim 6, further comprising:
    causing an actuator to activate to cause a physical change in the physical scene based on the timeline.

9. A system of augmenting a physical scene of a live performance via projection overlays for driving augmentation of the live performance, wherein the physical scene is part of a multiple scene set comprising at least a second physical scene adjacent to the physical scene in the multiple scene set, and wherein the live performance includes a storyline that spans the multiple scene set, the system comprising:
    a processor programmed to:
        access sensor information from a sensor device;
        identify a location on the physical scene at which a user device is directed based on the sensor information;
        generate one or more projection images to be newly projected onto the physical scene to augment the physical scene at the location;
        cause a projection device to project the one or more projection images onto the physical scene at the location;
        identify a first projection image associated with a first portion of the storyline;
        cause a first projection device to project the first projection image onto the physical scene;
        identify a second projection image associated with a second portion of the storyline; and
        cause a second projection device to project the second projection image onto the second physical scene after the first projection image is projected onto the physical scene.

10. The system of claim 9, wherein to generate one or more projection images to augment the physical scene at the location, the processor is further programmed to:
    adjust the behavior of the one or more projection images; and
    cause the projection device to project the one or more projection images based on the adjusted behavior.

11. The system of claim 9, wherein the multiple scene set is part of a site having multiple sets through which audience members traverse to experience the storyline such that the storyline spans the multiple sets, wherein the processor is further programmed to:
coordinate the projection of the first projection image at the physical scene with the projection of the second projection image at a second physical scene of a second set of the multiple sets based on a timeline of the storyline.

12. The system of claim 9, wherein the live performance follows a storyline that includes an audience interactive element that requires an audience member to perform a physical action to advance the storyline, wherein the processor is further programmed to:
detect that the physical action has been performed; and
control the projection device to project at least one projection image that corresponds to the physical action to give the appearance that the physical action caused a behavior of the least one projection image.

13. The system of claim 9, wherein the projector is further to:
control the projection device to project at least one projection image that appears to interact with a physical object;
wherein the system further comprises:
an actuator device to move the physical object responsive to projection of the at least one projection image to give the appearance that the least one projection image caused the physical object to be moved.

14. A computer implemented method of augmenting a physical scene of a live performance via projection overlays with real-time signal detection for driving augmentation of the live performance, wherein the physical scene is part of a multiple scene set comprising at least a second physical scene adjacent to the physical scene in the multiple scene set, and wherein the live performance includes a storyline that spans the multiple scene set, the method comprising:
emitting, by a beacon device, a beacon signal for positioning a user device in the physical scene;
accessing, by a processor, location information relating to a location of the user device, the location information based on the beacon signal;
identifying, by the processor, a location on the physical scene at which the user device is directed based on the location information;
generating, by the processor, one or more projection images to be newly projected onto the physical scene to augment the physical scene at the location;
causing, by the processor, a projection device to project the one or more projection images at the location;
identifying, by the processor, a first projection image associated with a first portion of the storyline, the first projection image assigned to be projected by the projection device;
causing, by the processor, the projection device to project the first projection image onto the physical scene;
identifying, by the processor, a second projection image associated with a second portion of the storyline, the second projection image assigned to be projected by a second projection device; and
causing, by the processor, the second projection device to project the second projection image onto the second physical scene after the first projection image is projected onto the physical scene.

* * * * *